(12) United States Patent
Maeda et al.

(10) Patent No.: US 9,565,336 B2
(45) Date of Patent: Feb. 7, 2017

(54) COPYING APPARATUS

(71) Applicant: Brother Kogyo Kabushiki Kaisha, Nagoya-shi, Aichi-ken (JP)

(72) Inventors: Jyunji Maeda, Ichinomiya (JP); Atsushi Yokochi, Chiryu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/086,372

(22) Filed: Mar. 31, 2016

(65) Prior Publication Data

US 2016/0352964 A1    Dec. 1, 2016

(30) Foreign Application Priority Data

May 29, 2015 (JP) ................... 2015-109898

(51) Int. Cl.
| | |
|---|---|
| *H04N 1/00* | (2006.01) |
| *H04N 1/387* | (2006.01) |
| *H04N 1/04* | (2006.01) |
| *H04N 1/23* | (2006.01) |
| *H04N 1/41* | (2006.01) |

(52) U.S. Cl.
CPC ........... *H04N 1/3876* (2013.01); *H04N 1/04* (2013.01); *H04N 1/233* (2013.01); *H04N 1/3877* (2013.01); *H04N 1/41* (2013.01); *H04N 2201/0094* (2013.01)

(58) Field of Classification Search
CPC ........ H04N 1/3876; H04N 1/04; H04N 1/233; H04N 1/41; H04N 1/3877; H04N 2201/0094
USPC ....................................................... 358/1.6
See application file for complete search history.

(56) References Cited

U.S. PATENT DOCUMENTS

| | | | |
|---|---|---|---|
| 2001/0015821 A1* | 8/2001 | Namizuka | G06T 3/40 358/1.15 |
| 2006/0067584 A1* | 3/2006 | Sato | H04N 1/00167 382/239 |
| 2007/0279673 A1* | 12/2007 | Utsunomiya | G03G 15/55 358/1.14 |
| 2010/0245914 A1* | 9/2010 | Harada | H04N 1/32358 358/1.16 |
| 2011/0025860 A1* | 2/2011 | Katougi | G06T 3/4069 348/207.2 |

FOREIGN PATENT DOCUMENTS

JP        2002-232692 A        8/2002

* cited by examiner

*Primary Examiner* — Allen H Nguyen
(74) *Attorney, Agent, or Firm* — Banner & Witcoff, Ltd.

(57) ABSTRACT

A copying apparatus is configured to repeat a first operation to scan an image on an original sheet along a first direction with changing a position of the first operation along a second direction perpendicular to the first direction, and generate pixel data of pixels of the image on the original sheet. Compressed image data is generated by compressing the pixel data within each of multiple sections divided in the first direction having boundaries extend in the second direction. The compressed image data is decompressed. A 90-degree rotation processing is applied to the decompressed image data in the unit of a band, which has a particular number of pixels in the first direction and extends along the second direction, to generate decompressed image data, Then, with use of the decompressed image data after rotation processing has been executed, the image is recorded on a recording sheet.

14 Claims, 13 Drawing Sheets

COPYING APPARATUS

This application claims priority under 35 U.S.C. §119 from Japanese Patent Application No. 2015-109898 filed on May 29, 2015. The entire subject matter of the application is incorporated herein by reference.

BACKGROUND

Technical Field

The present disclosures relate to a copying apparatus.

Related Art

Conventionally, there has been known a so-called serial type recording apparatus, which is configured to form an image on a recording sheet such that a recording head is reciprocally conveyed in one direction and the recording sheet is conveyed in a direction perpendicular to the conveying direction of the recording head. There has also been known a scanning apparatus, which is configured to scan an image on an original sheet such that a relative position between a line sensor extending in one direction and the original sheet is conveyed in a direction different from (e.g., perpendicular to) the extending direction of the line sensor. Further, a copying apparatus having functions of both the above-described recording apparatus and the scanning apparatus has also been known.

In the copying apparatus of this type, the scanning direction of the original sheet and the recording direction (i.e., the conveying direction of the recording head) may be different from each other. In such a case, in order to form the scanned image on the recording sheet, the image data may be modified so that the image is rotated by 90 degrees (i.e., an arrangement of pixel data should be converted).

In one conventional copying apparatus, image data generated by a scanning device is divided into four sections in the scanning direction, and each of the four sections is divided into four subsections in a direction perpendicular to the scanning direction. Then, image data corresponding to each of the subsections is generated.

Such a conventional copying apparatus is configured to convert the image data for each of the subsections into compressed image data, and store the compressed image data in a memory. When the 90-degree rotation process is executed, pieces of compressed image data corresponding to the subsections aligned in a line in the direction perpendicular to the scanning direction are decompressed, and each piece of pixel data is arranged in a memory in accordance with positions of the pixels, thereby converted image data being generated.

SUMMARY

According to the above-mentioned conventional art, in which an image pixel group is divided meshwise (i.e., divided in two directions which are perpendicular to each other) into multiple sections, a group of pixels is divided in the two directions.

When an entire image constituted by the multiple subsections is to be printed by decompressing the image data of each of the multiple subsections, the image data of each of the multiple subsections is decompressed and connected in accordance with the recording direction. Therefore, according to the conventional art, location of each pixel data must be managed, and troublesome processing for connecting the multiple pieces of image data corresponding to the multiple sections should be performed.

According to aspects of the disclosures, there is provided a technique to converting the image data representing a scanned image to image data suitable for recording with suppressing troublesome processing and required memory capacity even if the scanning direction and recording direction are different.

According to aspects of disclosures, there is provided a copying apparatus, which is provided with a commanding unit configured to input an operation command, a scanning unit configured to execute, in response to receipt of the operation command from the commanding unit, a scanning operation to repeat a first operation to scan an image on an original sheet along a first direction with changing a position of the first operation along a second direction which is perpendicular to the first direction, and a generating operation to generate pixel data of pixels of the image on the original sheet, a compression unit configured to generate compressed image data by compressing the pixel data within each of multiple sections which are defined by dividing the image of the original sheet in the first direction such that boundaries between adjoining sections extend in the second direction, a decompression unit configured to decompress the compressed image data generated by the compression unit to generate rotation-subjected data which includes at least part of decompressed data of the compressed image data as decompressed image data, a rotation processing unit configured to apply 90-degree rotation processing to the decompressed image data generated by the decompression unit, and a recording unit configured to record the image of the original sheet on a recording sheet by repeatedly executing a recording operation to form the image of the original sheet in a unit of band which has a particular number of pixels in the first direction and extends along the second direction with use of the decompressed image data to which the rotation processing has been applied by the rotation processing unit.

According to aspects of the disclosures, there is also provided a copying apparatus, which is provided with a commanding device configured to input an operation command, a scanning device configured to execute, in response to receipt of the operation command from the commanding device, a scanning operation to repeat a first operation to scan an image on an original sheet along a first direction with changing a position of the first operation along a second direction which is perpendicular to the first direction, and a generating operation to generate pixel data of pixels of the image on the original sheet, a compression circuit configured to generate compressed image data by compressing the pixel data within each of multiple sections which are defined by dividing the image of the original sheet in the first direction such that boundaries between adjoining sections extend in the second direction, a decompression circuit configured to decompress the compressed image data generated by the compression circuit to generate rotation-subjected data which includes at least part of decompressed data of the compressed image data as decompressed image data, a rotation processing circuit configured to apply 90-degree rotation processing to the decompressed image data generated by the decompression circuit, and a recording device configured to record the image of the original sheet on a recording sheet by repeatedly executing a recording operation to form the image of the original sheet in a unit of band which has a particular number of pixels in the first direction and extends along the second direction with use of the decompressed image data to which the rotation processing has been applied by the rotation processing circuit.

According to the copying apparatus, a group of pieces of pixel data generated by the scanning unit or scanning device are distributed into multiple sections, which are divided in the first direction and have boundaries extending in the second direction, and compressed per respective sections, thereby multiple pieces of compressed image data for respective sections being generated. Accordingly, when the image data for recording is generated, it is unnecessary to combine multiple decompressed data corresponding to the multiple pieces of compressed image data as is performed in conventional art.

Further, according to the copying apparatus, in a situation where a 90-degree rotation processing is to be applied to the image data (i.e., pixel data group) due to difference between the scanning direction (i.e., the first direction) and the recording direction (i.e., the second direction), it is unnecessary to rotate the image data of the entire image of the original sheet at a time, a memory capacity required to generate the image data for recording can be suppressed in comparison with a case where the image data of the entire image of the original sheet should be rotated.

Therefore, according to aspects of the disclosures, even in a case where the scanning direction (i.e., the first direction) and the recording direction (i.e., the second direction) are different from each other, no complicated data processing is necessary, and the image data generated by the scanning operation can be converted to the image data for recording efficiently with suppressing the memory capacity necessary for the processing.

BRIEF DESCRIPTION OF THE ACCOMPANYING DRAWINGS

DETAILED DESCRIPTION OF EMBODIMENTS

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storages, hard disk drives, floppy drives, permanent storages, and the like.

A copying apparatus 1 (see FIG. 1) according to an illustrative embodiment of the disclosures has a scanning device 20 and a recording device 50. According to the illustrative embodiment, the scanning device 20 is either a flatbed type or auto-document feeding type scanning device. Further, according to the illustrative embodiment, the recording device 50 is an inkjet printing device.

The copying apparatus 1 is configured such that the scanning device 20 scans an image on an original sheet P to generate scan image data D0 representing the scanned image. Then, based on the image data D0, the copying device 1 generates recording image data D7 and D17. Then, the copying apparatus 1 causes the recording device 50 to form an image on a recording sheet Q in accordance with the image data D7 and D17, thereby a copied image of the original sheet P being formed on the recording sheet Q. In the following description, structures and operations regarding a copying function which the copying apparatus 1 has will be described. It is noted that the copying apparatus 1 is only an example of a copying apparatus, and the copying apparatus may be interpreted as an apparatus such as a digital complex apparatus (e.g., a multi-function peripheral) having functions of a scanner, a printer, a copier and a facsimile machine.

Figure 1:
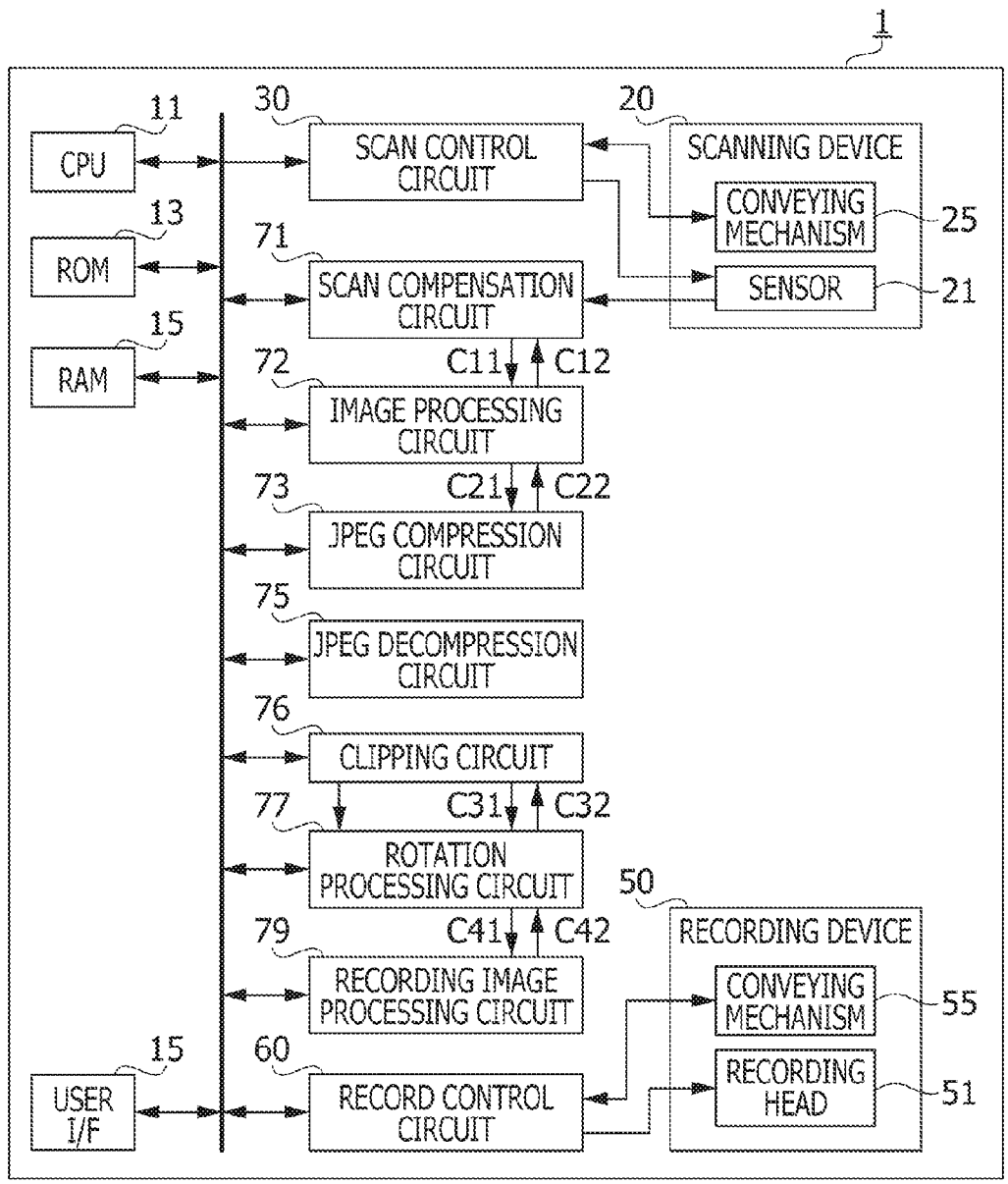
FIG. 1 is a block diagram showing an electrical configuration of a copying apparatus according to an illustrative embodiment of present disclosures.

As shown in FIG. 1, the copying apparatus 1 has a CPU 11, a ROM (read only memory) 13, a RAM (random access memory) 15, the scanning device 20, a scan control circuit 30 configured to control the scanning device 20, the recording device 50 and a record control circuit 60 configured control the recording device 50.

The copying apparatus 1 further has a scan compensation circuit 71, an image processing circuit 72, a JPEG compression circuit 73, a JPEG decompression circuit 75, a clipping circuit 76, a rotation processing circuit 77 and a recording image processing circuit 79, which are used to generate image data D7 and D17 for recording from scan image data for each line which is generated by the scanning device 20.

The CPU 11, the ROM 13, the RAM 15, the scan control circuit 30, a user interface 40, the record control circuit 60, the scan compensation circuit 71, the image processing circuit 72, the JPEG compression circuit 73, the JPEG decompression circuit 75, the clipping circuit 76, the rotation processing circuit 77, the record image processing circuit 79 are interconnected through a bus.

The CPU 11 controls respective components of the copying apparatus 1 by executing processes in accordance with programs stored in the ROM 13. The RAM 15 is used as a work memory. The scanning device 20 is provided with a line sensor 21 and a conveying mechanism 25. The line sensor 21 has, for example, a CIS (contact image sensor). The conveying mechanism 25 is configured to move the line sensor 21 and/or convey the original sheet P.

Figure 2A:
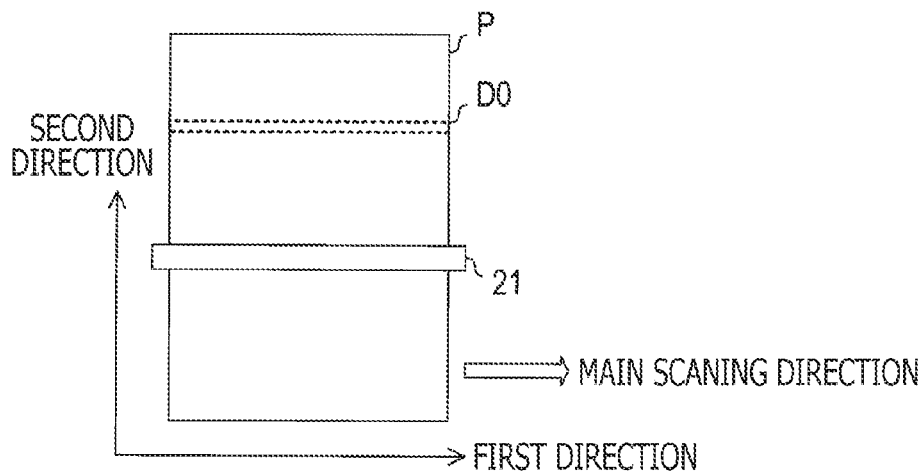
FIG. 2A illustrates a correspondence between an orientation of the copying apparatus and an orientation of a line sensor according to the illustrative embodiment of the disclosure.

The line sensor 21 is arranged along a first direction of the copying apparatus 1 as shown in FIG. 2A, and a scanning direction of the line sensor 21 is set to extend in the first direction. According to one example, the conveying mechanism 25 is configured to move the line sensor 21 in a second direction, which is perpendicular to the first direction, of the copying apparatus 1 along a plane of the original sheet P. According to another example, the conveying mechanism 25 may be configured to convey the original sheet P in the second direction so as to pass over the line sensor 21.

The scanning device 20 is controlled by the scan control circuit 30 which causes the line sensor 21 to repeatedly perform a scanning operation to scan a line of the image of the original sheet P in the first direction, with changing a relative position between the original sheet P and the line sensor 21, thereby generating the scan image data D0 of each line, which represents a scanned image of the original sheet P.

According to the illustrative embodiment, the scanning device 20 generates scan image data D0 including pixel data representing each pixel one the line, for each of the lines extending in the first direction. The scan image data D0 for each line generated by the scanning device 20 is input to the scan compensation circuit 71 in accordance with a generated order. In the illustrative embodiment, a largest size of the original sheet which can be scanned by the scanning device 20 is an A4 size (i.e., 210 mm×297 mm). When the A4 size original sheet is scanned, the A4 size original sheet P is arranged with respect to the scanning device 20 such that a longer side thereof is parallel to the second direction.

The scan control circuit 30 controls, in accordance with a command of the CPU 11, a scanning operation of each line with the line sensor 21 as described above. Further, the scan control circuit 30 controls a conveying operation of the line sensor 21 and/or the original sheet P with the conveying mechanism 25. In the following description, a scanning direction (i.e., the first direction) of the line sensor 21 will be referred to as a main scanning direction, and a scanning direction by the conveyance of the line sensor 21 and/or the original sheet P (i.e., the second direction) will be referred to as an auxiliary scanning direction.

When a copy command is input through the user interface 40, the CPU 11 inputs an operation command to the scan control circuit 30. The user interface 40 is configured to acquire a user operation, and display information for the user. For example, the user interface 40 is configured such that a touch panel is overlaid on an LCD (liquid crystal display). The user interface 40 is configured to receive an operation signal corresponding to the user operation on the touch panel, and transmit the same to the CPU 11.

Figure 2B:
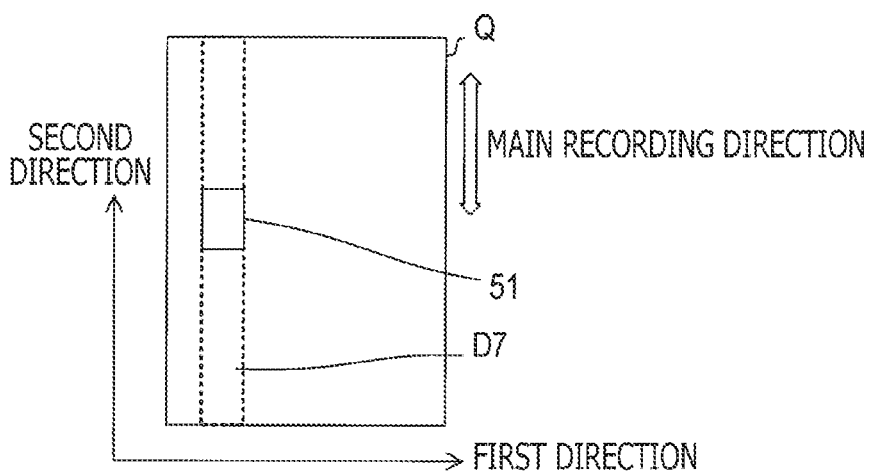
FIG. 2B illustrates a correspondence between an orientation of the copying apparatus and a moving direction of a recording head according to the illustrative embodiment of the disclosure.

The recording device 50 has a recording head 51 and a conveying mechanism 55. According to the illustrative embodiment, the recording head 51 is an inkjet head. The conveying mechanism 55 is, as shown in FIG. 2B, configured to reciprocally move the recording head 51 in the second direction. Further, the conveying mechanism 55 is configured to convey the recording sheet Q in the first direction so as to pass over the recording head 51.

The recording device 50 forms on the recording sheet Q, as in conventional devices, under control of a record control circuit 60. That is, the recording device 50 is configured to move the recording head 51 in one way in the second direction, with causing the recording head 51 to eject ink drops onto the recording sheet Q during conveyance of the recording head 51, thereby causing the recording head 51 to perform a recordation operation along the second direction.

The recording device 50 forms an image on an entire surface of the recording sheet Q by repeatedly conveying the recording sheet Q in the first direction by a particular amount every time the recording head 51 is moved in one way to form an image on the recording sheet Q. An image formed on the recording sheet Q with use of the copying function is a copy of an image formed on the original sheet P and scanned by the scanning device 20. In the following description, a term "path" is defined. The path is an area on the recording sheet Q, and an image is formed within each area (i.e., "path") when the recording head 51 is moved in one way in the second direction. The path has an elongated rectangular area which has a particular number of pixels in the first direction (i.e., a width) and is elongated in the second direction. The particular amount, which is the conveying amount of the recording sheet Q, corresponds to the width of the "path" in the first direction. According to the illustrative embodiment, the maximum size of the recording sheet Q which can be arranged in the recording device 50 is the A4 size (i.e., 210 mm×297 mm). It is noted that the A4 size sheet is to be arranged in the recording device 50 such that the longer side of the A4 size sheet extends in the second direction.

The record control circuit 60 controls the recording head 51 and the conveying mechanism 55 in accordance with a command from the CPU 11. According to the illustrative embodiment, the record control circuit 60 controls a recording operation (i.e., an ink drop ejection operation) of the recording head 51. Further, the record control circuit 60 controls a conveying operation of the recording head Q and the moving operation of the recording head 51. With this control, the record control circuit 60 causes the recording device 50 to form a copy of the image of the original sheet P on the recording sheet Q based on the image data D7 and D17 for recordation, which is generated by the record image processing circuit 79. In the following description, regarding the recording operation, a recording direction (i.e., the second direction) defined by moving the recording head 51 will also be referred to as the main recording direction, and the recording direction defined by the conveyance of the recording sheet Q (i.e., the first direction) is also referred to as an auxiliary recording direction.

Figure 3:
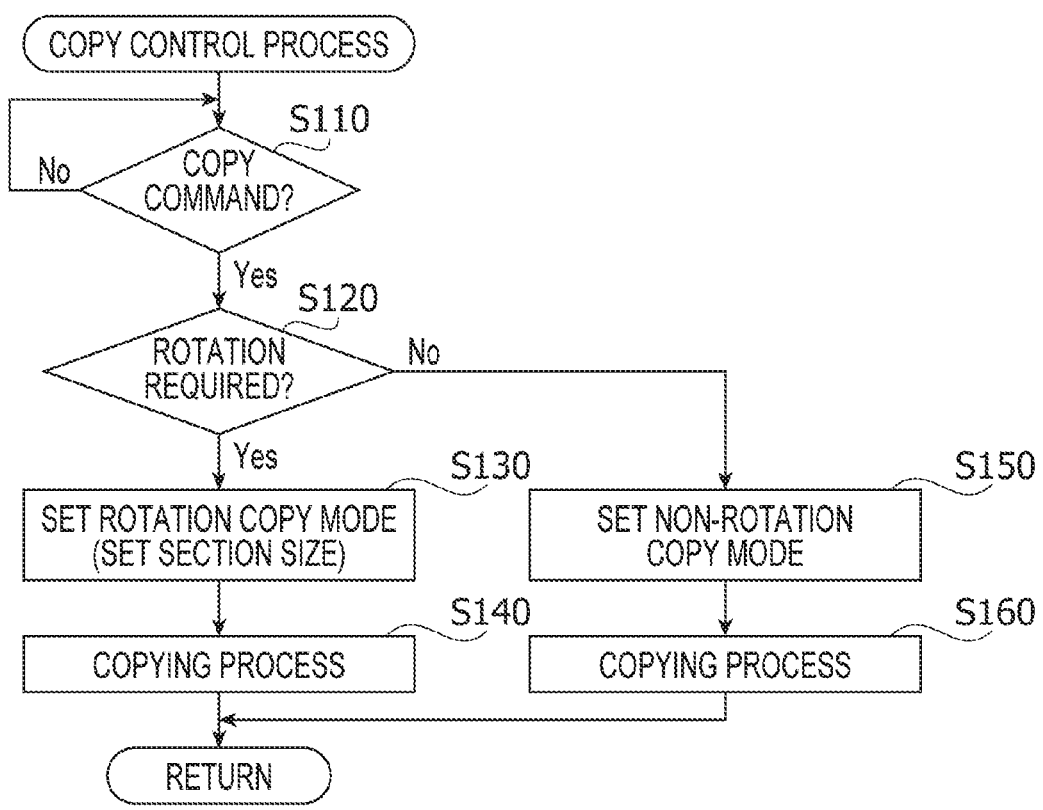
FIG. 3 is a flowchart illustrating a copy control process executed by a CPU (central processing unit) of the copying apparatus according to the illustrative embodiment of the disclosure.

Next, referring to FIG. 3, a copy control process executed by the CPU 11 will be described. It is noted that the CPU 11 repeatedly executes the copy control process in order to acquire the copy command input by the user. When the copy command is input through the user interface 40 (S110: YES), the CPU 11 determines whether the input copy command is a command requiring the rotation process in order to copy the same (S120). When it is determined that the copy command includes an instruction to copy an image of the A4 size original sheet P, which is the maximum size for the copying apparatus 1, onto an A4 recording sheet Q at the same magnification, the CPU 11 determines that the copy command requires the rotation process.

In the copying apparatus 1 according to the illustrative embodiment, as shown in FIGS. 2A and 2B, the main scanning direction and the main recording direction intersect with each other. When the original sheet P and the recording sheet Q are arranged to have the same orientation, pixel data arranged along the main scanning direction in the scan image data D0 for each line should be converted such that the pixels are rearranged along the auxiliary scanning direction (i.e., the main recording direction) to generate the image data D7, D17 for recording. Such a rearrangement corresponds to the rotation process described above.

The image data is configured such that multiple data sets each including pixel data for the pixels arranged in the main scanning direction (i.e., an X axis direction) are arranged in the auxiliary scanning direction (i.e., a Y axis direction). It is noted that a coordinate system for the scanning device 20 and a coordinate system for the recording device 50 have a relationship that one is turned with respect to the other by 90 degrees since, in the scanning device 20, the main scanning direction extends along the X axis, while, in the recording device 50, the main recording direction extends along the X axis. Due to this relationship, in order to record the image of the original sheet P on the recording sheet Q according to the same orientation, it is necessary to apply the rotation process to the image data group constituting the scan image data D0 for each line so that the X axis and the Y axis is interchanged to generate the image data D7, D17 for recording.

In S120, a copy command which is input when the orientation of the original sheet P arranged in the scanning device 20 and the orientation of the recording sheet Q arranged in the recording device 50 have relationship that one is turned with respect to the other by 90 degrees, it is determined that the rotation process is unnecessary with respect to the copy command input in this state. It is noted that such a copy command may be generated when, for example, the size of the original sheet P and the size of the recording sheet Q is A5 which is smaller than A4 size.

When it is determined that the rotation process is necessary (S120: YES), the CPU 11 sets the operation mode of the JPEG compression circuit 73, the JPEG decompression circuit 75, the clipping circuit 76 and the rotation processing circuit 77 to a rotation copy mode, which is an operation mode to realize the necessary copying process including the rotation process (S130). Then, the CPU 11 inputs the operation command to the circuits 30, 60 and 71-79 (S140).

When it is determined that the rotation process is unnecessary (S120: NO), the CPU 11 sets the operation mode of the JPEG compression circuit 73, the JPEG decompression circuit 75, the clipping circuit 76 and the rotation processing circuit 77 to a non-rotation copy mode, which is an operation mode to realize the necessary copying process not including the rotation process (S150). Then, the CPU 11 inputs the operation command to the circuits 30, 60 and 71-79 (S160).

Figure 4:
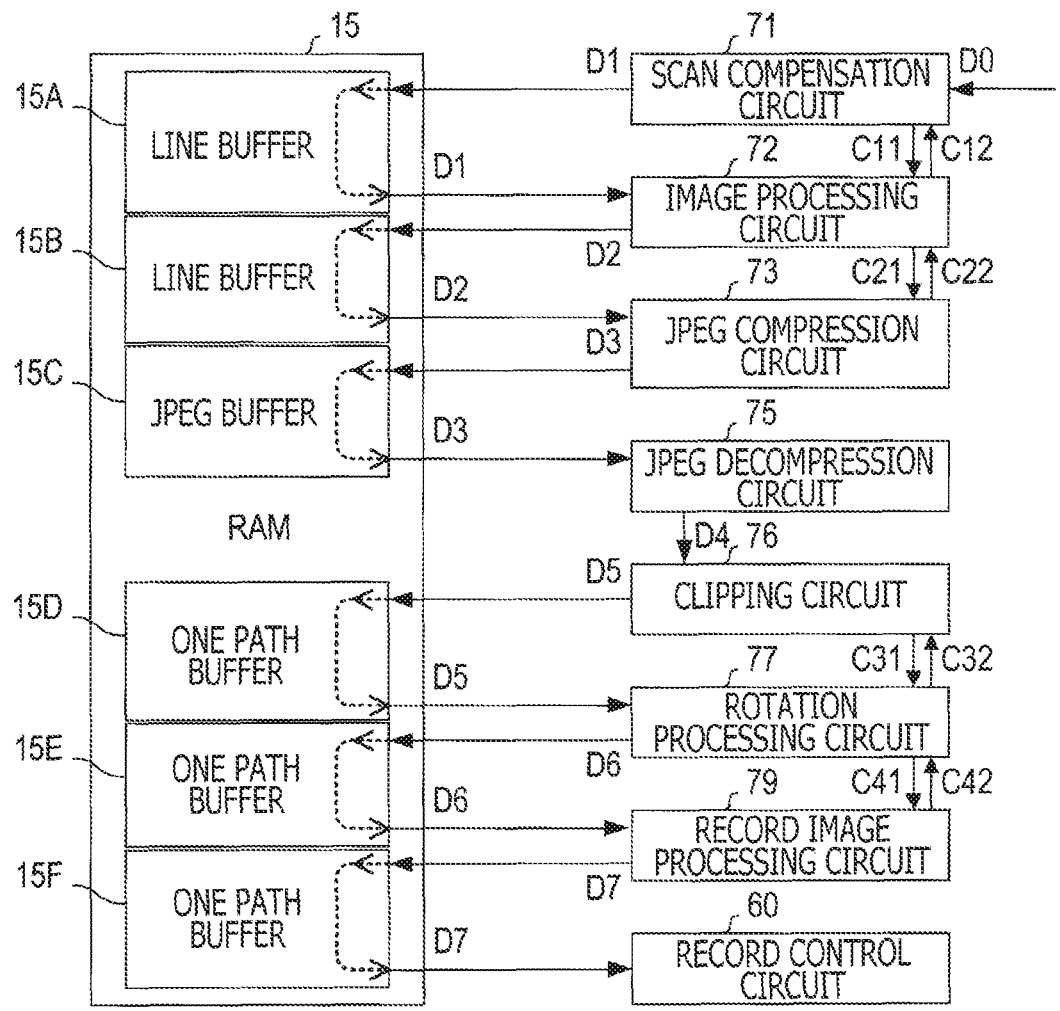
FIG. 4 illustrates a circuit structure related to recording in a rotation copy mode according to the illustrative embodiment of the disclosure.
Figure 5:
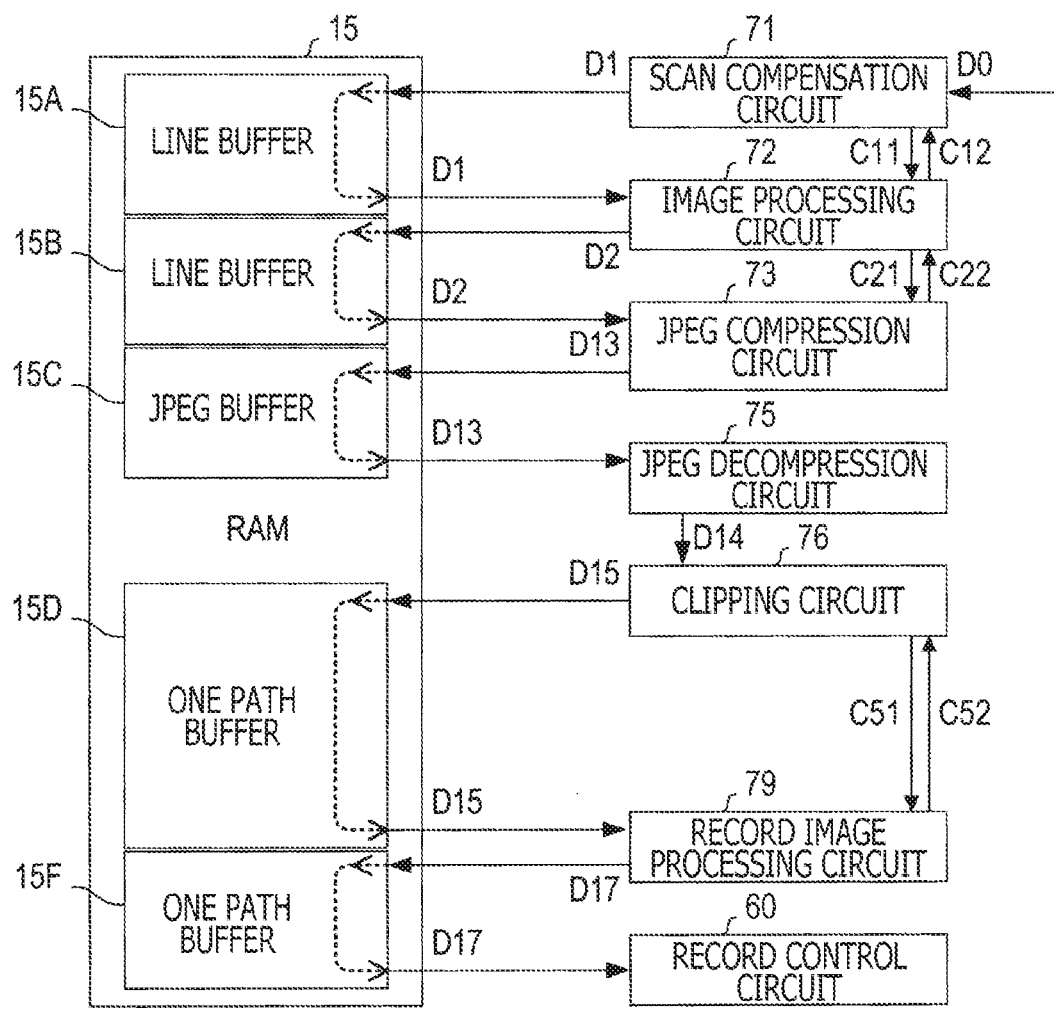
FIG. 5 illustrates a circuit structure related to recording in a non-rotation copy mode according to the illustrative embodiment of the disclosure.

Next, configurations and operations of the circuits 71-79 which operate to convert the scan image data D0 to the image data D7, D17 for recordation will be described in detail. FIG. 4 illustrates operations of the circuits 71-79 in the rotation copy mode. FIG. 5 illustrates operations of the circuits 71-79 in the non-rotation copy mode. It is noted that JPEG compression circuit 73, the JPEG decompression circuit 75, the clipping circuit 76 and the rotation processing circuit 77 operate differently in the rotation copy mode and non-rotation copy mode.

The scan compensation circuit 71 shown in FIGS. 1, 4 and 5 is configured to convert the scan image data D0 input from the line sensor 21 for each line, which is analog data, to digital data, and applies various scan compensations including a shading compensation to the scan image data D0 after conversion. Converted scan image data D1 for each line is input to a line buffer 15A in the RAM 15. The line buffer 15A is a buffer configured to store a particular number of scan image data D1 on a line-by-line basis (i.e., in the unit of line).

The image processing circuit 72 is configured to retrieve the scan image data D1 on a line-by-line basis from the line buffer 15A, and the retrieved scan image data D1 which is of an RGB (red, green, blue) color system to scan image data D2 according to a YCbCr (Y: lightness, Cb, Cr: saturations) color system. The scan image data D2 generated for each line by the image processing circuit 72 is stored in the line buffer 15B of the RAM 15 on a line-by-line basis. The liner buffer 15B stored a particular number of scan image data D2 on a line-by-line basis.

The JPEG compression circuit 73 is configured to sequentially retrieve the scan image data D2 stored in the line buffer 15B in the unit of an MCU (minimum coded unit), and apply a JPEG compression process to the retrieved scan image data D2. As is well-known, the JPEG compression is executed in the unit of MCU.

Figure 6:
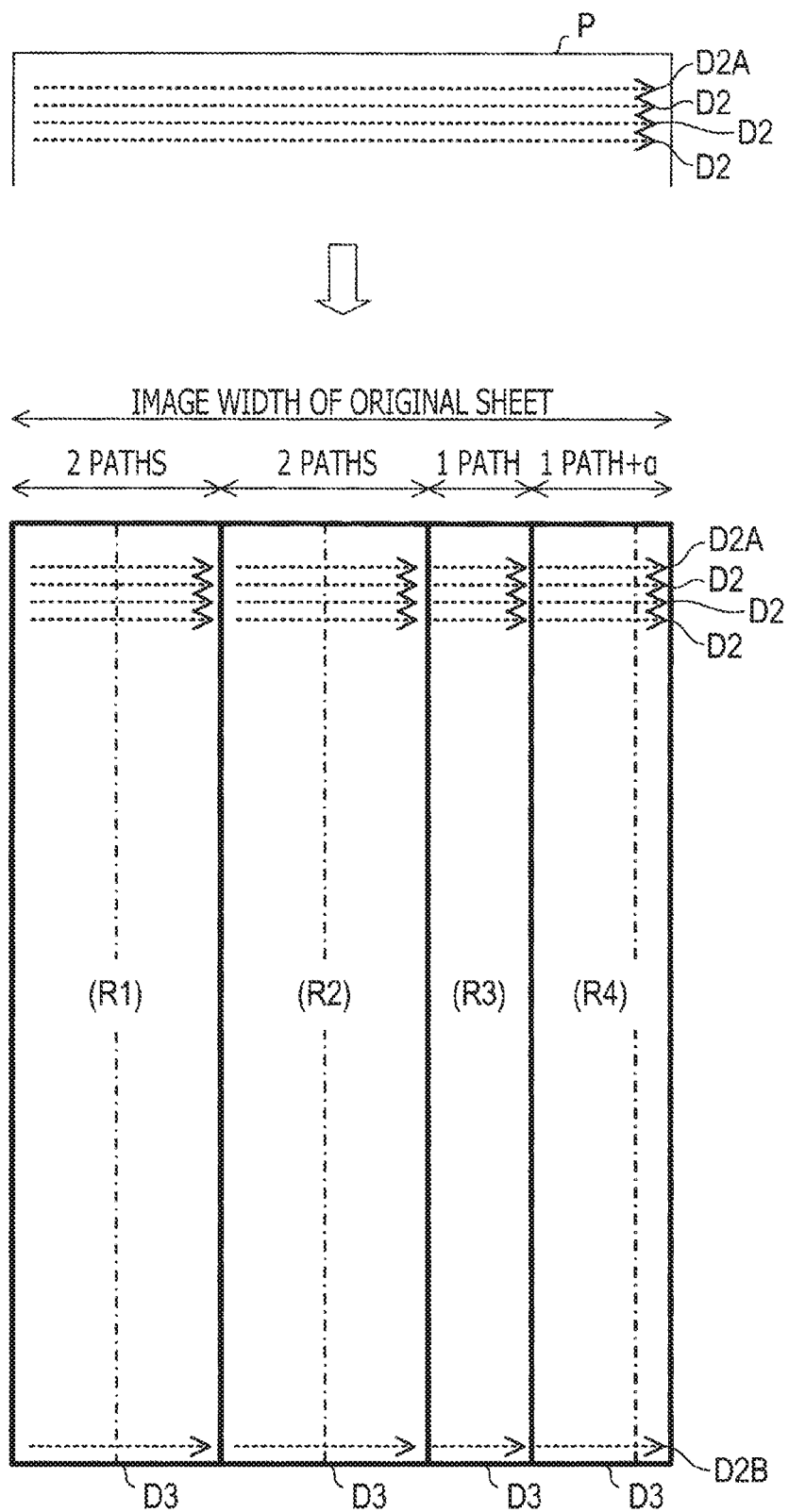
FIG. 6 illustrates a compression method in the rotation copy mode according to the illustrative embodiment of the disclosure.

The JPEG compression circuit 73 applies the JPEG compression to each piece of pixel data constituting the retrieved scan image data D2 by dividing the same into respective sections as shown in FIG. 6. It is noted that a reference numeral D2A shown in FIGS. 6 and 7 corresponds to the scan image data D2 of a top line, while a reference numeral D2B corresponds to the scan image data D2 of a last line.

According to the illustrative embodiment, a group of pixel data from the top line to the last line corresponding to the scan image data is divided into sections R1, R2, R3 and R4 (see FIG. 6) which have boundary lines extending along the auxiliary scanning direction (i.e., the second direction) perpendicular to the main scanning direction, and each of the sections R1, R2, R3 and R4 is compressed, thereby compressed image data D3 for each of the sections R1, R2, R3 and R4 is generated by the JPEG compression circuit 73.

It is noted that the sections R1, R2, R3 and R4 are defined by dividing the entire scanned image of the original sheet P represented by the scan image data from the top line to the last line in a single direction (i.e., the auxiliary scanning direction). It is noted that the number of sections is determined to be an integer multiple of MCU and an integer multiple of a path. That is, the number of pixels in the main scanning direction of each section is determined such that the number of pixels of the scan image data D2 in the main scanning direction is an integer multiple of the number of pixels of each path in the auxiliary recording direction. It is noted that the width of the original sheet P, or the number of pixels of the scan image data D in the main scanning direction is not always the integer multiple of the number of pixels of the path. Because of this reason, the section R4 is defined to be a section which need not be an integer multiple of one path, and is defined to be an extra section which does not belong to the other sections R1-R3. In FIG. 6, indication of "1 path+α" means that the width of the section R4 is greater than 1 path by an amount (i.e., the number of pixels) of certain number "α."

The compressed image data D3 for respective sections, which is generated by the JPEG compression circuit 73 is input to a JPEG buffer 15C of the RAM 15. The JPEG buffer 15C is configured to be a buffer having a capacity to store the compressed image data D3 of the sections R1, R2, R3 and R4 for one page. The JPEG compression circuit 73 will be described in detail later.

Figure 7:
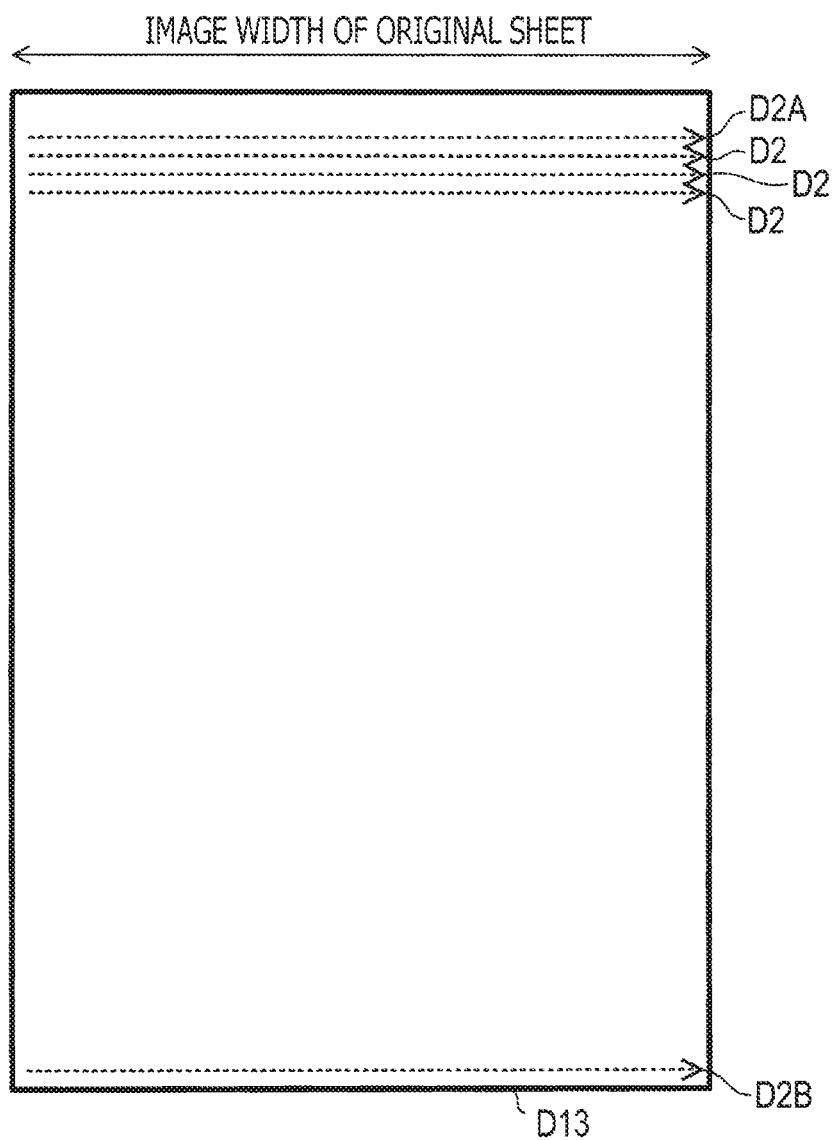
FIG. 7 illustrates a compression method in the non-rotation copy mode according to the illustrative embodiment of the disclosure.

The JPEG compression circuit 73 is configured to sequentially compress each piece of the pixel data constituting the scan image data D2 retrieved as above in accordance with a method similar to a conventional method in the non-rotation copy mode. That is, in the non-rotation copy mode, the JPEG compression circuit 73 applies the JPEG compression to a group of pixel data corresponding to the scan image data D2 from the top line to the last line as a whole as shown in FIG. 7, and generates one piece of compressed image data D13 corresponding to the entire image of the original sheet P. The compressed image data D13 is stored in the JPEG buffer 15C in the RAM 15.

Figure 8:
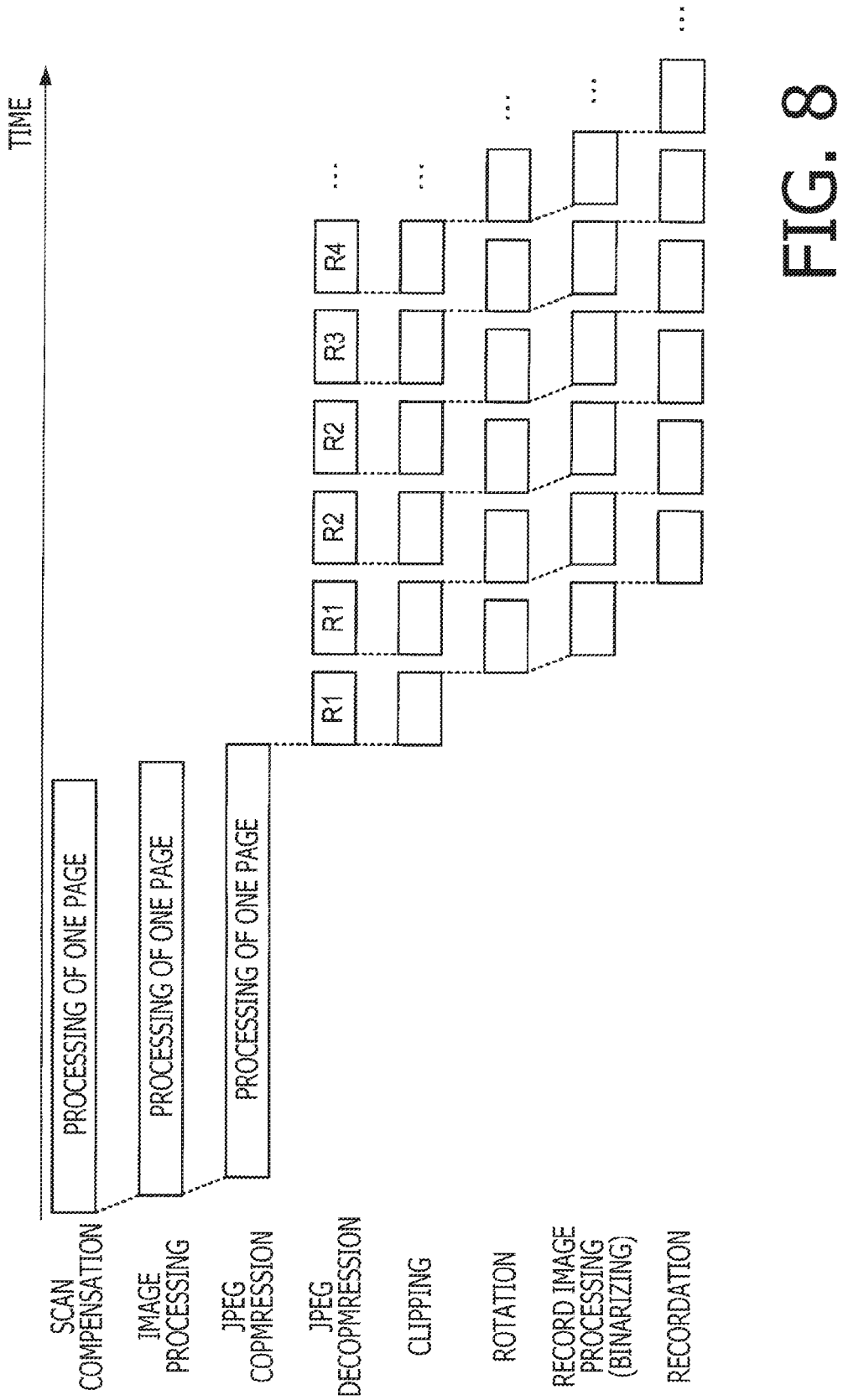
FIG. 8 illustrates a processing flow in the rotation copy mode according to the illustrative embodiment of the disclosure.

In the rotation copy mode, as shown in FIG. 8, scan image data D0 generated by the scanning device 20 for each line is sequentially processed in accordance with a pipeline system, and converted to compressed image data D3 for respective sections.

That is, the process of generating the scan image data D1 in the scan compensation circuit 71 (i.e., scan compensation) is sequentially applied to the scan image data D0 input from the scanning device 20 for each line during a process of scanning the original sheet P from the top line to the last line, which is executed by the scanning device 20. The process of generating the scan image data D2 (i.e., image processing) by the image processing circuit 72 is sequentially applied to the scan image data D1 generated by the scan compensation circuit 71.

Figure 9:
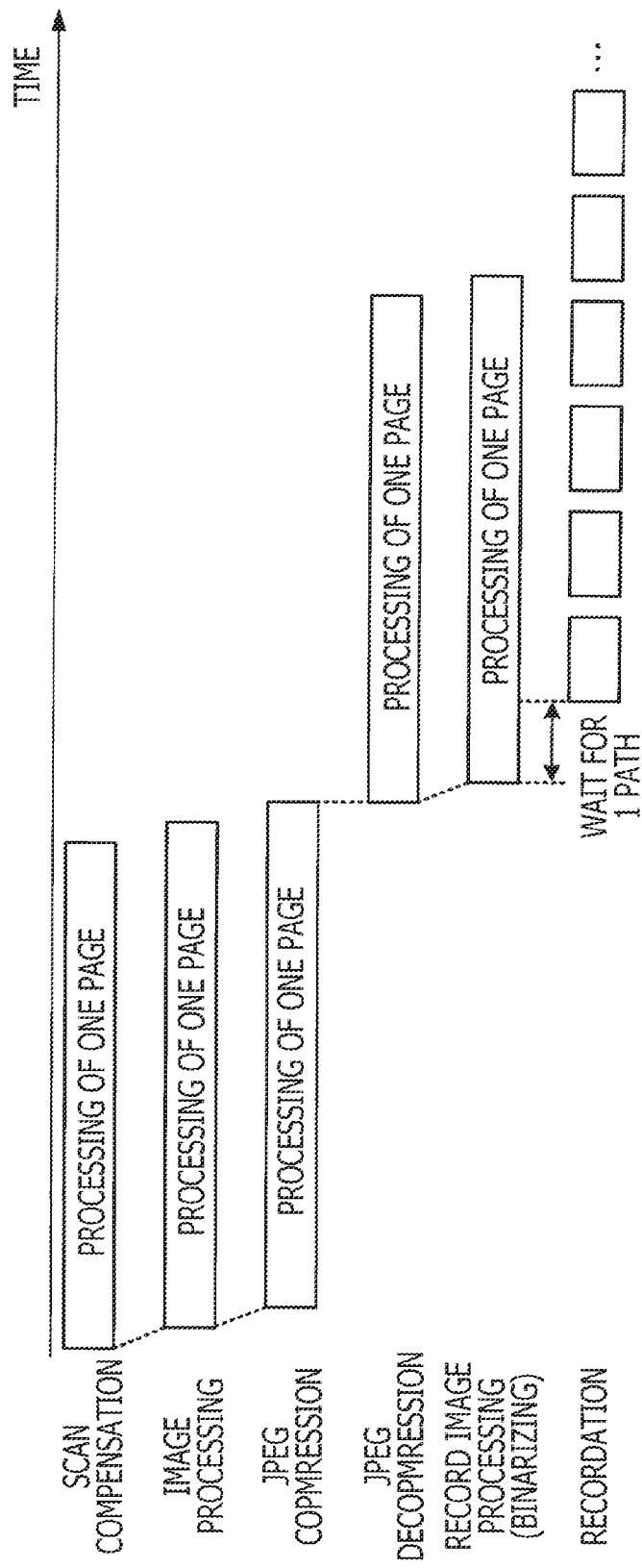
FIG. 9 illustrates a processing flow in the non-rotation copy mode according to the illustrative embodiment of the disclosure.

Further, the process of generating the compressed image data D3 (i.e., JPEG compression) by the JPEG compression circuit 73 is also sequentially applied to the scan image data D2 generated by the image processing circuit 72. The compressed image data D3 for respective sections is generated by the JPEG compression circuit 73 in parallel. In the non-rotation copy mode, the scan image data D0 for each line, which is generated by the scanning device 20, is sequentially processed as shown in FIG. 9, and converted into the compressed image data D13.

The JPEG decompression circuit 75 is configured to retrieve the compressed image data D3 in the unit of a section from the JPEG buffer 15C in accordance with progression of recording operation by the recording device 60 in the rotation copy mode. The JPEG decompression circuit 75 decompresses the retrieved compressed data D3, and generate scan image data D4 corresponding to each section as decompressed data corresponding to the compressed data D3. The generated decompressed data D4 is input to the clipping circuit 76.

The JPEG decompression circuit sequentially retrieves the compressed image data D13 from the top, decompresses the retrieved portion of the compressed image data D13 sequentially, and inputs the decompressed scan image data D14 into the clipping circuit 76, in the non-rotation copy mode.

Figure 10:
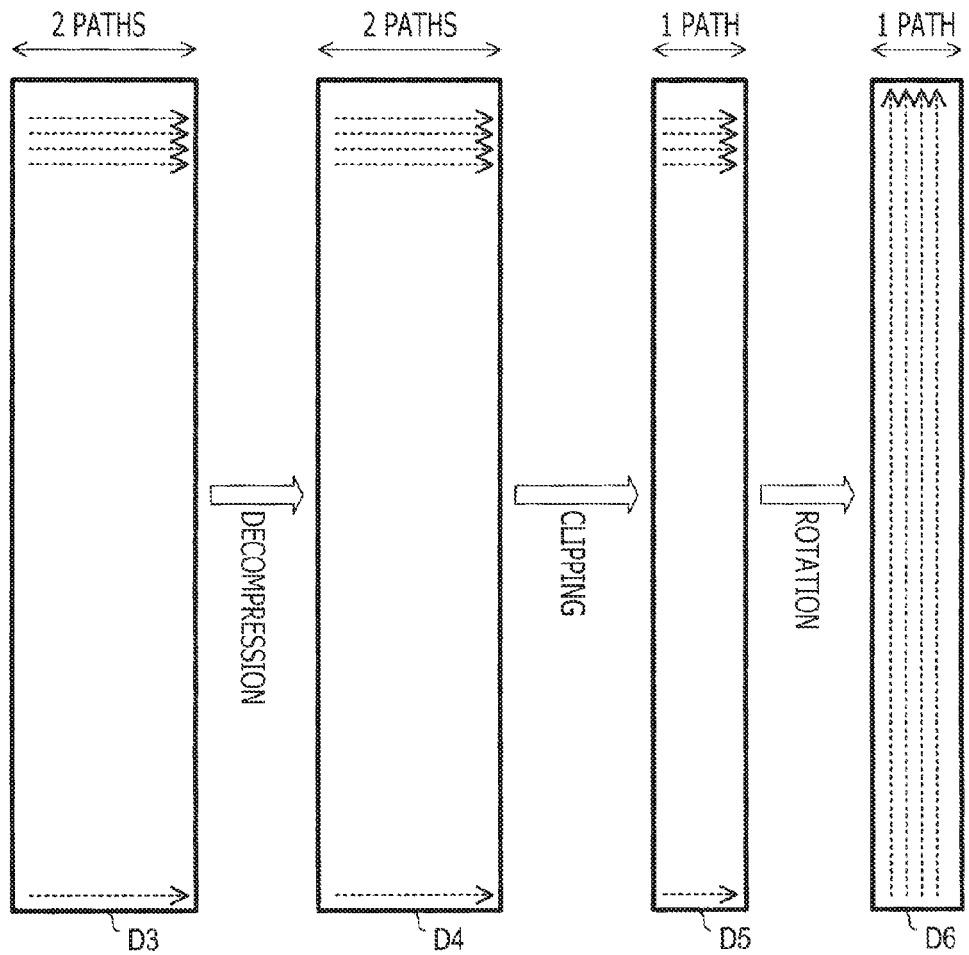
FIG. 10 illustrates a process from decompression to rotation in the rotation copy mode according to the illustrative embodiment of the disclosure.

The clipping circuit 76 extracts, in the rotation copy mode, the scan image data for one path from the scan image data D4 input from the JPEG decompression circuit 75 in accordance with the progression of the recording operation by the recording device 50 as shown in FIG. 10, and inputs the extracted scan image data D5 in a one path buffer 15D of the RAM 15.

According to the above-described illustrative embodiment, when the recording sheet Q is conveyed and an image is recorded in the auxiliary recording direction, the scan image data D5 of the sections R1, R2, R3 and R4 becomes necessary in this order. According to the illustrative embodiment, each of the sections R1 and R2 corresponds to a section for two paths. The section R4 is also wider than one path.

Therefore, the JPEG decompression circuit 75 operates, in the rotation copy mode, to decompress the compressed data D3 of the section R1 twice, the compressed data D3 of the section R2 twice, the compressed data D3 of the section R3 once, and the compressed data D3 of the section R4 twice as shown in FIG. 8.

The clipping circuit 76 operates to extract the scan image data for one path which is initially used for recording (i.e., a left-half area of the section R1 in FIG. 6) from the firstly decompressed scan image data D4 of the section R1, and extract the scan image data for the remaining one path (i.e., a right-half area of the section R1 in FIG. 6) from the secondly decompressed scan image data D4 of the section R1. Then, the clipping circuit 76 operates to sequentially input respective pieces of the extracted scan image data D5 in the one path buffer 15D.

Further, the clipping circuit 76 operates to extract the scan image data for one path from the firstly decompressed scan image data D4 of the section R2, and extract the scan image data for the remaining one path from the secondly decompressed scan image data D4 of the section R2. Then, the clipping circuit 76 operates to sequentially input respective pieces of the extracted scan image data D5 in the one path buffer 15D.

Thereafter, the clipping circuit 76 inputs the scan image data D5 corresponding to the decompressed scan image data D4 of the section R3 in the one path buffer 15D. Since the decompressed image data D4 of the section R3 is the scan image data for one path, the clipping circuit 76 inputs all the decompressed scan image data D4 of the section R3 into the one path buffer 15D as the scan image data D5.

Further, the clipping circuit 76 operates to extract the scan image data for one path firstly used for recording from the firstly decompressed scan image data D4 of the section R4, and extract the scan image data for the remaining area from the secondly decompressed scan image data D4 of the section R4. Although the scan image data D4 of the remaining area is data of which amount is less than the amount for one path, it is formally converted to the scan image data D5 for one path, and input to the one path buffer 15D.

In the non-rotation copy mode, the clipping circuit 76 is configured to input the scan image data D14 input from the JPEG decompression circuit 75 into the one path buffer 15D as the scan image data D15 for every one path, without applying any processes thereto.

The rotation processing circuit 77 is configured to retrieve the scan image data D5 for each path from the one path buffer 15D, executes the rotating process, and input the scan image data D6 after the rotating process is applied to a one path buffer 15E in the rotation copy mode. The rotating process here is, as shown in FIG. 10, a process of converting the scan image data D5, in which the pixel data is arranged in the order of pixels arranged along the main scanning direction, to the scan image data D6, in which the pixel data is arranged in the order of pixels which are arranged along the main recording direction (i.e., the auxiliary scanning direction). The rotating process is a process of rearranging the arrangement of the pixel data. By this rearrangement, the image of which pixels are arranged along the X axis is rotated by 90 degrees.

As shown in FIG. 8, the rotating process by the rotation processing circuit 77 is executed every time when the scan image data D15 for one path is stored in the one path buffer 15D by the clipping circuit 76 as shown in FIG. 8. In order to realize the above-described process in the clipping circuit 76 and the rotation process circuit 77, the one path buffer 15D is configured to have a capacity of at least two paths. The rotation processing circuit 77 is configured not to operate in the non-rotation copy mode. It is noted that the rotation processing circuit 77 is not shown in FIG. 5 since the rotation processing circuit 77 does not substantially operate in the non-rotation mode.

The recording image processing circuit 79 operates to convert the scan image data D6 after the rotation process is applied and stored in the one path buffer 15E to image data D7 for recording in the unit of a path in the rotation copy mode. According to the illustrative embodiment, the recording image processing circuit 79 applies a binarizing process to the scan image data D6, thereby converting the same to the image data D7 for recording. The image data D7 for recording, which is generated by the recording image processing circuit 79 is input to the one path buffer 15F in the RAM 15.

The recording image processing circuit 79 operates to convert the scan image data D15 stored in the one path buffer 15D to the image data D17 for recording, in the unit of a path, from the top. The image data D17 for recording, which is generated by the recording image processing circuit 79, is input to the one path buffer 15F in the RAM 15.

The record control circuit 60 is configured to retrieve the image data D7 for recording, which is stored in the one path buffer 15F, in the unit of a path, and control the recording device 50 based on the retrieved image data D7, in the rotation copy mode.

According to the illustrative embodiment, the record control circuit 60 uses the image data D7 for recording, which is stored in the one path buffer 15F, in the unit of a path, causes the recording head 51 to execute, as the recording operation, the ink drop ejecting operation based on the image data D7 for recording with causing the conveying mechanism 55 to move the recording head 51 by a half way amount.

In the non-rotation process mode, the record control circuit 60 uses the image data D7 for recording, which is stored in the one path buffer 15F, in the unit of a path, causes the recording device 50 to form an image (i.e., a copy image of the original sheet P) based on the image data D17, similarly in the rotation copy mode.

Next, further operations and configurations of respective components will be described. As shown in FIGS. 1, 4 and 5, the recording compensation circuit 71 and the image processing circuit 72 are configured to operate in association with each other with exchanging association signals C11 and C12. The image processing circuit 72 and the JPEG compressing circuit 73 are also configured to operate in association with each other with exchanging association signals C21 and C22. The clipping circuit 76 and the rotation processing circuit 77 are also configured to operate in association with each other with exchanging association signals C31 and C32. The rotating process circuit 77 and the recording image processing circuit 79 are also configured to operate in association with each other with exchanging association signals C41 and C42. The clipping circuit 76 and the recording image processing circuit 79 are configured to operate, in the non-rotation copy mode, in association with each other with exchanging association signals via the rotation processing circuit 77.

Figure 11:
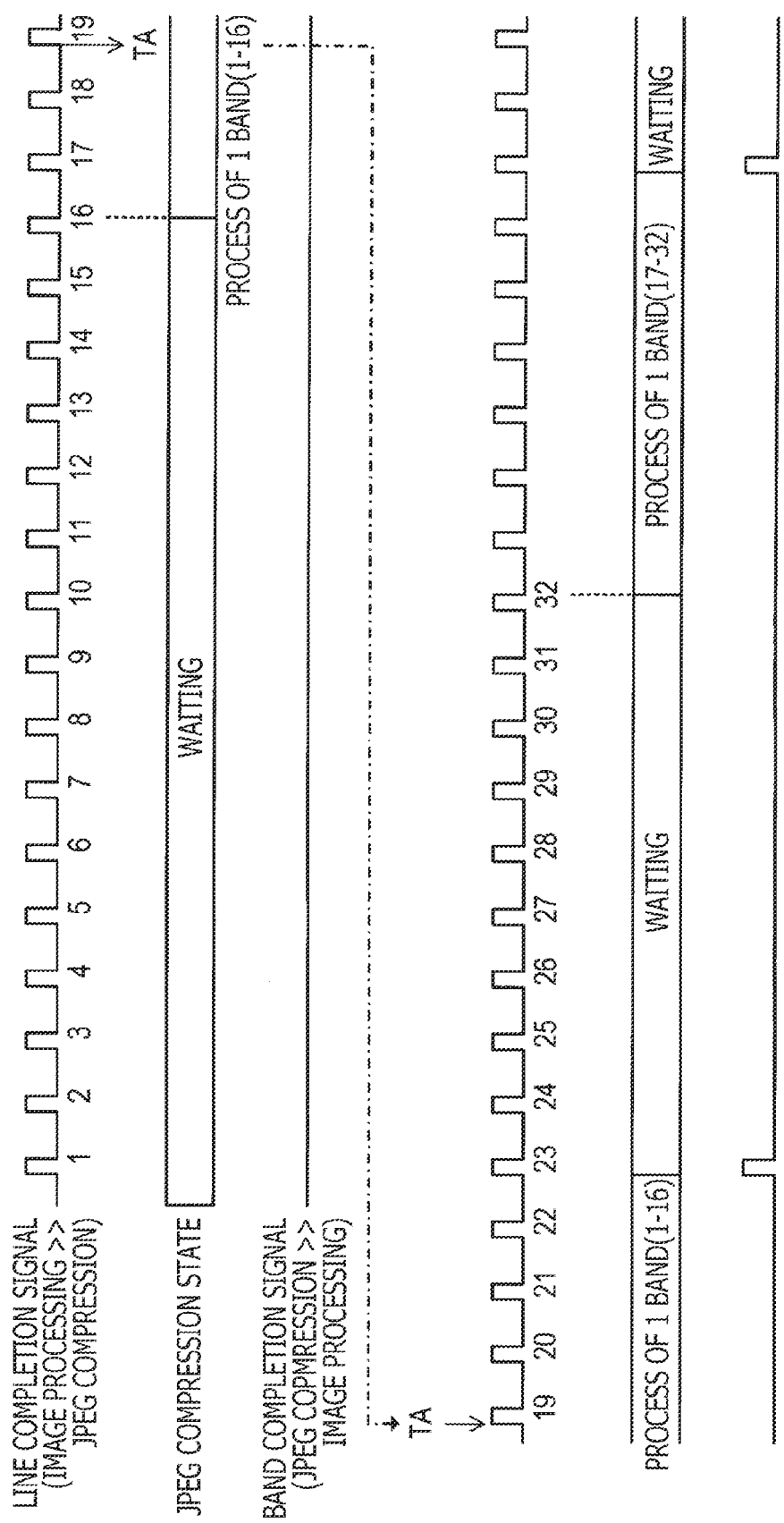
FIG. 11 shows a linkage between an operation of an image processing circuit and a JPEG (Joint Photographic Experts Group) compression circuit according to the illustrative embodiment of the disclosure.

From the image processing circuit 72 to the JPEG compression circuit 73, a line completion signal shown in FIG. 11 is input as the association signal C21, and from the JPEG compression circuit 73 to the image processing circuit 72, a band completion signal shown in FIG. 11 is input as the association signal C22. The image processing circuit 72 is configured to input the line completion signal (C21) to the JPEG compression circuit 73 every time the scan image data D2 for one line is input in the line buffer 15B. The line completion signal is used to cause the JPEG compression circuit 73 to recognize that necessary data for the JPEG compression circuit 73 has become available.

The JPEG compression circuit 73 is configured to input the above-described band completion signal to the image processing circuit 72 every time when the JPEG compression of N lines of image is completed. According to the illustrative embodiment, the number N is sixteen (16). It is noted that the number N depends on the size of the MCU. Typically, the MCU is defined to have 8×8 pixels, 16×8 pixels or 16×16 pixels. Therefore, the number N could be eight (8). The band completion signal is input to the image processing circuit 72 every time the JPEG compression of one line of MCU in the main scanning direction is completed. In the following description, a group of the pixel data for N lines, that is, a group of one line of pixel data of the MCU will occasionally be referred to MCU band data. The compressed image data D3, D13 described above are written in the JPEG buffer 15C in the order of portions of which the JPEG compression has completed on a unit of the MCU. It is noted that the scan image data D2 corresponding to the data which has been stored in the JPEG buffer 15C need not be stored in the line buffer 15B. the band completion signal is used when the image processing circuit 72 identifies unnecessary scan image data D2 in the line buffer 15B.

In FIG. 11, the line completion signal (C21) and the band completion signal (C22) are shown in two rows. A point of time TA in the lower row coincides with a point of time TA in the upper row. That is, the line completion signal (C21) and the band completion signal (C22) in the lower rows starting from time TA is continued from the line completion signal (C21) and the band completion signal (C22) in the upper rows at time TA. Both in the upper rows and lower rows, time axes are set from left-hand side to right-hand side. In FIG. 11, the numbers indicated in the line completion signal correspond to the line numbers of the scan image data D2 which has been input in the line buffer 15B. A JPEG compression state indicates an operation state of the JPEG compression circuit 73. A state "processing of 1 band" is a state where the JPEG compression of N lines are being executed, and a state "waiting" is a state where execution of JPEG compression is held due to shortage of data.

That is, FIG. 11 shows that the image processing circuit 72 inputs the line completion signal (C21) to the JPEG compression circuit 73 every time the image processing circuit 72 writes the scan image data D2 in the line buffer 15B, and the JPEG compression circuit 73 inputs the band completion signal (C22) to the image processing circuit 72 after completion of the JPEG compression at every N line, which is a unit of row of the MCU along the main scanning direction.

Figure 12:
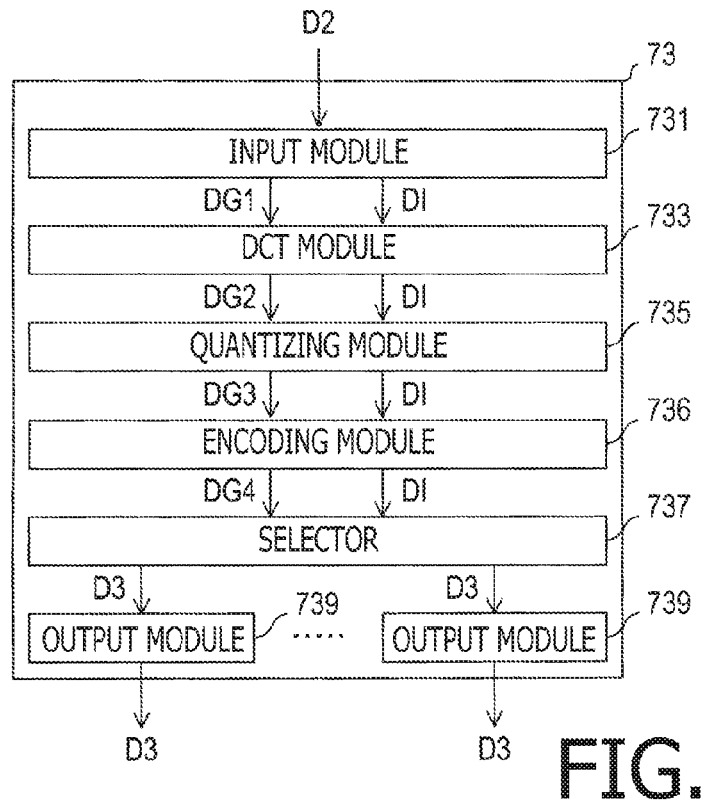
FIG. 12 is a block diagram showing a configuration of the JPEG compression circuit according to the illustrative embodiment of the disclosure.

Next, the JPEG compression circuit 73 will be described in detail with reference to FIG. 12. The JPEG compression circuit 73 has an input module 731, a DCT module 733, a quantization module 735, an encoding module 735, a selector 737 and an output module 739.

The input module 731 is configured to retrieve the scan image data D2 from the line buffer 15B in the unit of an MCU, and transmit the same to downstream side as data stream G1. The input module 731 is configured to synchronize with the data stream DG1 and transmits section identification data DI identifying the section R1, R2, R3 or R4 to which the pixel corresponding to the data stream DG1 belong to a downstream side.

The DCT module 733 is configured to apply discrete cosine transforming (DCT) to the data stream DG1 from the input module 31, and transmit the same to downstream side. The transformed data stream DG2 is input to the quantization module 735. The DCT module 733 is configured to transmit the section identification data DI from the input module 731 to the quantization module 735 in accordance with input of the data stream DG2 to the quantization module 735.

The quantization module 735 is configured to quantize the data stream DG2 from the DCT module 733 with use of a quantization table, and input the quantized data stream DG3 to the encoding module 736. The quantizing module 735 is configured to transfer the section identification data DI from the DCT module 733 to the encoding module 736 in accordance with input of the data stream DG3 into the encoding module 736.

The encoding module 736 converts the data stream DG3 from the quantization module 735 to encoded data by applying an entropy encoding thereto. The encoding module 736 inputs data stream DG4 of the encoded data in the selector 737. The encoding module 736 is configured to transfer the section identification data DI from the quantization module 735 to the selector 737 in accordance with input of the data streams DG4 to the selector 737.

The selector 737 is configured to distribute the data stream DG4 from the encoding module 736 to corresponding output module 739 in accordance with a section identified by the section identification data DI. The number of the output modules 739 is determined to correspond to the maximum value of the sections, and each of the output modules 739 corresponds to respective one of the multiple sections. The selector 37 distributes the data stream DG4 of the encoded data in accordance with the correspondence therebetween. That is, the selector 737 operates to input the encoded data corresponding to the pixels included in the data stream DG4, to the output module 739 of the corresponding section.

The output module 739 of each section is configured to receive the encoded data of the corresponding section input from the encoding module 736, and write the received encoded data in the JPEG buffer 15C as the compressed image data D3 thereof. Thus, the JPEG compression circuit 73 is configured to execute a process to generate the compressed image data D3 for respective sections based on a group of scan image data D2 representing the image of the original sheet P scanned by the scanning device 20. It is noted that most of parts of the circuits are common, and the above-described process is executed for respective sections in parallel.

Figure 13:
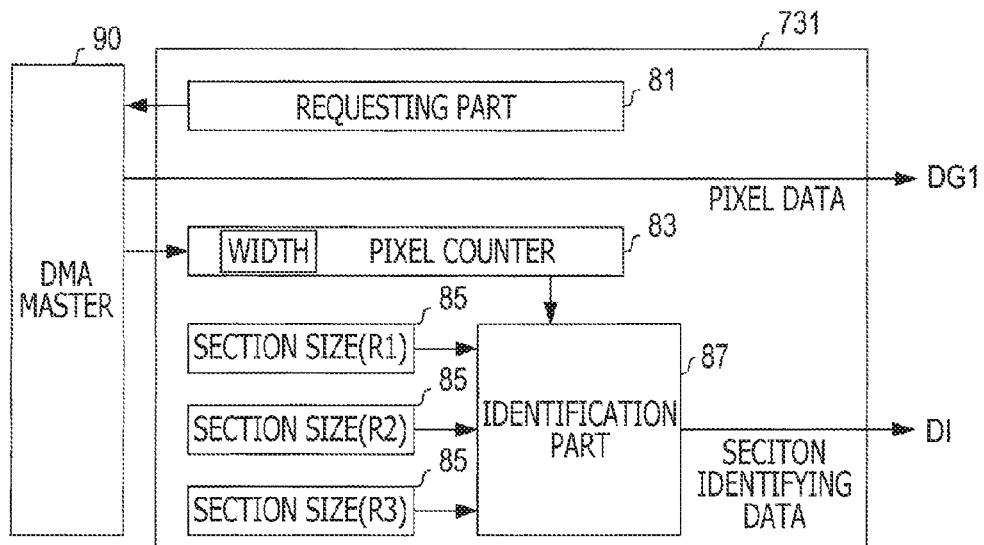
FIG. 13 is a block diagram of a configuration of an input module of the JPEG compression circuit according to the illustrative embodiment of the disclosure.

Further, the input module 731 is configured to have, as shown in FIG. 13, a requesting part 81, a pixel counter 83 and multiple section size storage 85 and an identification part 87.

The requesting part 81 is configured to input a request for retrieving of the scan data D2 to a DMA master 90. The DMA mater 90 is configured to obtain the scan data D2 from the line buffer 15B in the unit of an MCU in accordance with the request for retrieving the scan image data D2. The DMA master 90 is provided in the JPEG compression circuit 73.

The DMA master 90 is configured to input the pixel data of each of the pixels constituting the scan image data D2 which is obtained in the unit of an MCU into a DCT module 733 sequentially as data stream DG1. Further, the DMA master 90 is configured to input the count-up signal into the pixel counter 83 in accordance with input of the pixel data into the DCT module 733. The data stream DG1 is configured as a data stream in which multiple pieces of pixel data belonging to the same MCU are arranged in a particular order, for each MCU. That is, the data stream DG1 is configured as the data stream in which a group of multiple pieces of pixel data belonging to the same MCU are arranged in an ascending order of the line number, and a group of multiple pieces of pixel data for the same line are arranged in accordance with the order of arrangement of the pixels along the main scanning direction (i.e., in the line direction).

The pixel counter 83 is configured to count the number of input pixels, which is the number of pieces of pixel data transmitted from the DMA master 90 to the DCT module 733 by updating (i.e., incrementing) the count value in accordance with the count-up signal. A width of the scan image data D2 (i.e., the number of pixels in the main scanning direction) is set to the pixel counter 83, and when the count value exceeds N times the number of pixels corresponding to the width, the count number is reset to zero (0). Thus, the pixel counter 83 resets the count value to zero every time the pixel data for one row of the MCU, so that the pixel counter 83 is configured to count the number of pixels from the top pixel of each line of the MCU.

It is noted that multiple section size storage 85 are provided in accordance with the maximum number of sections, and the multiple section size storages 85 store the widths (i.e., the numbers of pixels in the main scanning direction) of respective sections. The identification part 87 identifies the section to which the pixel corresponding to the count value updated by the pixel counter 83 belongs based on information of widths of respective sections stored in the section size storages 85, and input the identification data DI of the identified section to the DCT module 733 synchronously with the data stream DG1.

With this configuration, the JPEG compression circuit 733 is capable of identifying the sections corresponding to the pixel data. A value calculated by adding one (1) to a quotient which is obtained by dividing the count value updated by the pixel counter 83 by the number pixels the MCU corresponds to an arrangement number from the top of the MCU band data of the MCU corresponding to the input pixel data. In accordance with this relationship, the identification part 87 is capable of identifying the section to which the pixel corresponding to the count value updated by the pixel counter.

According to the copying apparatus 1, in response to input of the copy command from the user interface 40, the scanning device 20 executes an operation to scan the image of the original sheet P along the first direction of the copying apparatus, which is repeated along the second direction that is perpendicular to the first direction, under control of the scan control circuit 30. With this configuration, the scanning device 20 generates scan image data D0 which has pixel data of each pixel of the image on the original sheet P for each line along the first direction.

The JPEG compression circuit 73 is configured to compress the group of pixel data constituting the scan image data D2 from the top line to the last line of the image which is generated by applying the scan compensation and image processing to the scan image data D0 such that the compression is applied to each of the sections which are defined to divide the entire area of the image in the auxiliary scanning direction to generate the compressed image data D3 for respective sections.

The JPEG decompression circuit 75 decompresses the compressed image data D3 of each of the sections sequentially to generate the scan image data D4 which is the decompressed data of the compressed image data D3. The clipping circuit 76 generates the scanned image data D5 by extracting the image data of a particular band unit (i.e., for one path) which is necessary for recording operation from the scan image data D4.

The rotation processing circuit 77 executes, in association with the clipping circuit 76, the process of rotating the one path unit of scan image data D5 generated by the clipping circuit 76 by 90 degrees sequentially. The record image processing circuit 79 generates, in association with the rotation processing circuit 77, one path unit of image data D7 for recording with use of the scan image data D6, to which the rotating process has been applied, sequentially.

The recording device 50 forms the image of the original sheet P (i.e., a copy image) on the recording sheet Q by repeatedly executing the recording operation to form the one path unit of image of the original sheet P on the recording sheet Q in accordance with the control signal based on the one path unit image data D7 and transmitted from the record control circuit 60.

According to the copying apparatus 1, as described above, the group of pixel data is not divided in two directions, but divided in only one direction (i.e., the second direction), to generate the compressed image data D3 for respective sections. Therefore, when the image data D7 for recording is generated, it is not necessary to connect the decompressed data, which corresponds to the compressed data, along two directions. It is sufficient that the decompressed image data D5 is rotated. Therefore, according to the illustrative embodiment, the image data D7 for recording can be generated with processes which are less complicated than processes of conventional art. Thus, according to the illustrative embodiment, the scan image data D0 generated by scanning the image on the original sheet P can be efficiently converted to the image data D7 for recording.

Further, according to the illustrative embodiment, the scan image data D4 is converted into the scan image data D5 based on the paths with use of the clipping circuit 76. Therefore, a memory capacity necessary for the rotating process can be effectively suppressed. It is noted, however, the process of extracting the one path of scan image data D5 from the scan image data D4 could be omitted. That is, the scan image data D4 itself might be rotated. When the compressed image data D3 for each section is the compressed image data of one path amount, the above-described extraction process is unnecessary.

According to the copying apparatus 1, the rotating process can be executed with dividing the scan image data. Therefore, in comparison with conventional art which is configured to rotate the pixel data group of an entire image of an original sheet at a time, the rotating process can be executed efficiently according to the illustrative embodiment.

Further, according to the copying apparatus 1, the clipping circuit 76, the rotation processing circuit 77 and the recording image processing circuit 79 operate in association with each other, circuits arranged on downstream of data flow are configured to execute data processing efficiently in response to completion of data processing by circuits on the upstream side. Therefore, according to the illustrative embodiment, the memory capacity for respective processes can be suppressed.

Further, according to the illustrative embodiment, the scan image data D0 for each line, which is generated by the scanning device 20, is input to the DCT module 733 of the JPEG compression circuit 73 as the data stream DG1 having pixel data array. In this case, the input module 731 inputs the identification data DI of the section to, which the pixel belongs, to the DCT module in accordance with input of the pixel data to the DCT module 733. The JPEG compression circuit 73 operates to collect multiple pieces of pixel data in the sections included in the data stream DG1 for each section based on the section identification data DI and converts the same to generate the compressed image data D3.

It is noted that the input module 731 is configured such that the number of pixels input to the DCT module 733 for each piece of MCU band data with use of the pixel counter 83, and identifies the section corresponding to the pixel data input to the DCT module 733.

Therefore, according to the illustrative embodiment, the DCT module 733, the quantization module 735 and the encoding module 736 are commonly used for multiple sections, the compressed image data D3 for respective sections can be generated in parallel. That is, according to the illustrative embodiment, generation of the compressed image data D3 for respective sections can be executed efficiently, with suppressing a circuit scale. It is noted that, as a modification of the illustrative embodiment, the JPEG compression circuit 73 may be provided with the DCT modules, quantization modules and encoding modules for respective sections, and the input module may input the pixel data with distributing the same to respective sections.

According to the illustrative embodiment, the widths of the sections are basically defined as an integer multiple of the widths of respective paths. By defining the width of a section to be the integer multiple of the width of a path, wasteful process in the decompression process of the compressed image data executed by the JPEG decompression circuit 75 can be suppressed, and the decompression process can be executed efficiently. It is noted that, in order to maximize the efficiency of the decompression process, it is preferable to define the width of the section to be equal to the width of the path. It is further noted that, in such a case, the circuit scale tends to increase as the number of sections increases. Therefore, the width of the sections may be determined with taking the circuit scale and cost of the JPEG compression circuit 73 and the like.

According to the illustrative embodiment, the JPEG compression circuit 73 generates the compressed image data D13 which is generated by compressing the group of pixel data without dividing the same for the sections in the non-rotation copy mode. This operation is realized by the configuration in which the input module 731 formally inputs the identification data for only one section to downstream circuits as the section identification data DI in the non-rotation copy mode.

According to the illustrative embodiment, the JPEG decompression circuit is configured to sequentially decompress the compressed image data D13 from the top, and the record image processing circuit 79 is configured to generate the image data D1 for recording with sequentially using the decompressed scan image data D15. Then, the record control circuit 60 causes the recording device 50 to form the image of the original sheet P on the recording sheet Q in the unit of an MCU with sequentially using the image data D17.

According to the copying apparatus 1, appropriate compressed image data D3 or D13 is generated depending on the operation mode, and image data D7 or D17 for recording can be generated by efficiently decompressing the compressed image data D3 or D13.

Although not described, the copying apparatus may be configured such that a scanning resolution thereof is changeable. For example, the image processing circuit 72 may be configured to convert the scanned image data D1 into image data having the scan image resolution according to the copy command as well as the conversion of the color system. For example, the image processing circuit 72 may convert the scan image data D1 which has the maximum scan resolution of the copying apparatus to image data D2 which has lower scan resolution in accordance with the copy command.

It is noted that various methods are known to convert high-resolution image data to low-resolution image data. For example, the low-resolution image data may be generated by thinning parts of multiple pieces of pixel data. According to another example, the low-resolution image data can be generated by averaging pixel data of multiple adjoining pixels of the high-resolution image data to generate one pixel data representing the averaged value.

In such a case, the width of the scan image data D0 (i.e., the number of pixels in the main scanning direction) changes depending on the scan resolution. Therefore, the number of sections and/or the size of each section may be changed depending on the scan resolution.

For example, when the scan resolution is 300 dpi (dots per inch), the width of the scan image data when an A4 size original sheet P is scanned is 2500 pixels. When the width of the path is defined to be 400 pixels, and the sections R1, R2, R3 and R4 are defined as shown in FIG. 6, the widths of the sections R1, R2, R3 and R4 may be 800 pixels, 800 pixels, 400 pixels and 500 pixels, respectively.

Figure 14:
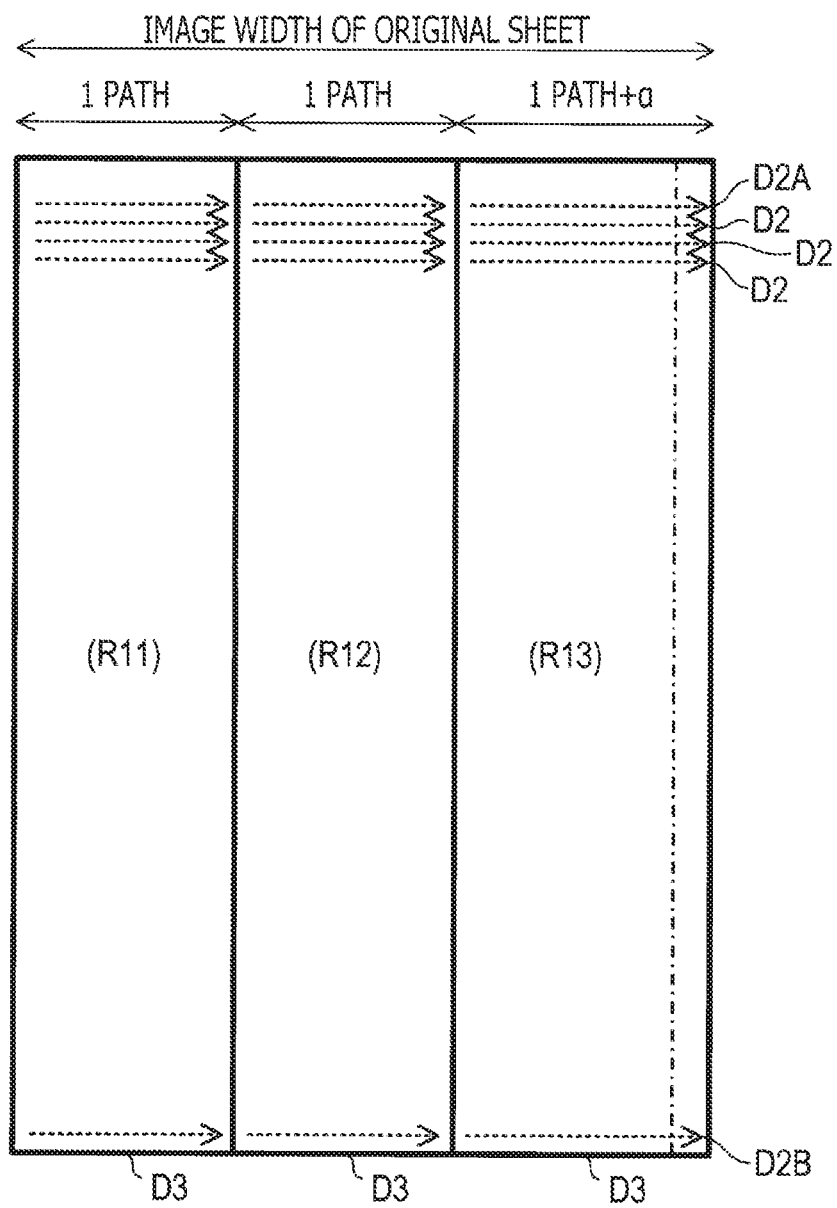
FIG. 14 illustrates a compression method when a scanning resolution is different, according to the illustrative embodiment of the disclosure.

In contrast, when the A4 size original sheet P is scanned at the scan resolution of 150 dpi, the width of the scan image data D0 is 1250 pixels. In this case, the sections may be defined as shown in FIG. 14, in which the widths of the sections R11, R12 and R13 are 400 pixels, 400 pixels and 450 pixels. It is noted that, in FIG. 14, indication of "1 path+a" means that the width of the section R3 is greater than 1 path by an amount (i.e., the number of pixels) of certain number "a."

Change of size/the number of the sections depending o the scan resolution can be realized as the CPU 11 is configured to set the width (i.e., the size of the section) according to the scan resolution to each of the section size storages 85 provided to the input module 731 of the JPEG compression circuit 73 in S130 of the copy controlling process. It is noted that, to the section size storage 85 corresponding to a section which will not be used as the number of the sections is decreased, zero (0) may be set as the section size. By changing the sections (i.e., size and/or the number) depending on the scan resolution, the decompression process of unnecessary data (e.g., unnecessary data which is not extracted by the clipping circuit 76) can be omitted, thereby further efficient data processing can be achieved. It is noted that the change of the scan resolution may be realized by changing the operation of the line sensor 21.

It is noted that aspects of the present disclosures need not be limited to the above-described illustrative embodiment, but various modifications may be available. For example, the aspects of the disclosures may be applied to a copying apparatus configured to compress scan image data in accordance with a method other than the JPEG compression method. For another example, the aspects of the disclosures may be applied to a copying apparatus provided with a serial type recording device other than one employing the inkjet recording method.

It is noted that the user interface 40 is an example of a commanding unit or a commanding device set forth in claims. The scanning device 20, the scan control circuit 30, the scan compensation circuit 71 and the image processing circuit 72 correspond to an example of a scanning unit or scanning device set forth in the claims. The recording device 50, the record control circuit 60 and the record image processing circuit 79 correspond to a recording unit of a recording device set forth in the claims. Portions of the JPEG compression circuit 73 except for the input module 731 corresponds to an example of a compression unit or a compression circuit set forth in the claims. Further, the input module 731 corresponds to an example of an input unit or an input device set forth in the claims. The JPEG decompression circuit 75 and the clipping circuit 76 correspond to a decompression unit or a decompression circuit set forth in the claims. The rotation processing circuit 77 corresponds to an example of a rotation processing unit or a rotation processing circuit. An operation of the CPU 11 to set information regarding the size of the sections depending on the scan resolution at S130 corresponds to an example of an operation realized by a switching unit or a switching device set forth in the claims.

What is claimed is:

1. A copying apparatus, comprising:
   a commanding unit configured to input an operation command;
   a scanning unit configured to execute, in response to receipt of the operation command from the commanding unit, a scanning operation to repeat a first operation to scan an image on an original sheet along a first direction with changing a position of the first operation along a second direction which is perpendicular to the first direction, and a generating operation to generate pixel data of pixels of the image on the original sheet;
   a compression unit configured to generate compressed image data by compressing the pixel data within each of multiple sections which are defined by dividing the image of the original sheet in the first direction such that boundaries between adjoining sections extend in the second direction;
   a decompression unit configured to decompress the compressed image data generated by the compression unit to generate rotation-subjected data which includes at least part of decompressed data of the compressed image data as decompressed image data;
   a rotation processing unit configured to apply 90-degree rotation processing to the decompressed image data generated by the decompression unit; and
   a recording unit configured to record the image of the original sheet on a recording sheet by repeatedly executing a recording operation to form the image of the original sheet in a unit of a band which has a particular number of pixels in the first direction and extends along the second direction with use of the decompressed image data to which the rotation processing has been applied by the rotation processing unit.

2. The copying apparatus according to claim 1, further comprising an input unit configured to input the pixel data generated by the scanning unit into the compression unit in a unit of an MCU following a JPEG compression method in an order of arrangement of the pixels along the first direction, and input identification data identifying a section in which the pixel data is input into the compression unit from among the multiple sections,
   wherein the compression unit is configured to generate compressed image data for respective sections by applying the JPEG compression method to the pixel data of the pixels within a same section based on the pixel data and the identification data input from the input unit.

3. The copying apparatus according to claim 2, wherein the input unit is configured to:
   count a number of pieces of the pixel data input to the compression unit;
   generate the identification data of the section to which the pixels corresponding to the pixel data input to the compression unit belong based on the counted number of pieces of the pixel data; and
   input the generated identification data into the compression unit.

4. The copying apparatus according to claim 1, wherein the decompression unit is configured to generate the compressed image data by extracting image data necessary to execute the recording operation in the unit of a band from the decompressed data of the compressed image data, and
   wherein the rotation processing unit is configured to apply a 90-degree rotating process to the decompressed image data generated by the decompression unit in the unit of a band.

5. The copying apparatus according to claim 1, wherein each of the multiple sections except one particular section is defined as a section including the pixels of which a number is an integer multiple of the number of pixels of the band in the first direction.

6. The copying apparatus according to claim 1, further comprising a switching unit configured to switch a number of the multiple sections and a size of each of the multiple sections in the first direction depending on a scan resolution when the scanning unit scans the image of the original sheet.

7. The copying apparatus according to claim 1, wherein the compression unit is configured to generate non-divided compressed image data which is generated by compressing a group of pixel data generated by the scanning unit as the compressed image data when a particular operation command is input from the commanding unit to the compression unit,
   wherein the decompression unit decompresses the non-divided compressed image data from a top thereof, and
   wherein the recording unit is configured to form the image of the original sheet on the recording sheet by repeatedly executing a recording operation of forming an image of the original sheet in the unit of a band with use of non-rotated image data, to which the rotation processing by the rotation processing unit to sequentially decompressing the non-divided compressed image data from the top thereof, has not been applied.

8. A copying apparatus, comprising:
   a commanding device configured to input an operation command;
   a scanning device configured to execute, in response to receipt of the operation command from the commanding device, a scanning operation to repeat a first operation to scan an image on an original sheet along a first direction with changing a position of the first operation along a second direction which is perpendicular to the first direction, and a generating operation to generate pixel data of pixels of the image on the original sheet;
   a compression circuit configured to generate compressed image data by compressing the pixel data within each of multiple sections which are defined by dividing the image of the original sheet in the first direction such that boundaries between adjoining sections extend in the second direction;
   a decompression circuit configured to decompress the compressed image data generated by the compression circuit to generate rotation-subjected data which includes at least part of decompressed data of the compressed image data as decompressed image data;
   a rotation processing circuit configured to apply 90-degree rotation processing to the decompressed image data generated by the decompression circuit; and
   a recording device configured to record the image of the original sheet on a recording sheet by repeatedly executing a recording operation to form the image of the original sheet in a unit of a band which has a particular number of pixels in the first direction and extends along the second direction with use of the decompressed image data to which the rotation processing has been applied by the rotation processing circuit.

9. The copying apparatus according to claim 8, further comprising an input device configured to input the pixel data generated by the scanning device into the compression circuit in a unit of an MCU following a JPEG compression method in an order of arrangement of the pixels along the first direction, and input identification data identifying a section in which the pixel data is input into the compression circuit from among the multiple sections,
   wherein the compression circuit is configured to generate compressed image data for respective sections by applying the JPEG compression method to the pixel data of the pixels within a same section based on the pixel data and the identification data input from the input device.

10. The copying apparatus according to claim 9, wherein the input device is configured to:
    count a number of pieces of the pixel data input to the compression circuit;
    generate the identification data of the section to which the pixels corresponding to the pixel data input to the compression circuit belong based on the counted number of pieces of the pixel data; and
    input the generated identification data into the compression circuit.

11. The copying apparatus according to claim 8, wherein the decompression circuit is configured to generate the compressed image data by extracting image data necessary to execute the recording operation in the unit of a band from the decompressed data of the compressed image data, and
    wherein the rotation processing circuit is configured to apply a 90-degree rotating process to the decompressed image data generated by the decompression circuit in the unit of a band.

12. The copying apparatus according to claim 8, wherein each of the multiple sections except one particular section is defined as a section including the pixels of which a number is an integer multiple of the number of pixels of the band in the first direction.

13. The copying apparatus according to claim 8, further comprising a switching circuit configured to switch a number of the multiple sections and a size of each of the multiple sections in the first direction depending on a scan resolution when the scanning device scans the image of the original sheet.

14. The copying apparatus according to claim 8,
wherein the compression circuit is configured to generate non-divided compressed image data which is generated by compressing a group of pixel data generated by the scanning device as the compressed image data when a particular operation command is input from the commanding device to the compression circuit,
wherein the decompression circuit decompresses the non-divided compressed image data from a top thereof, and
wherein the recording device is configured to form the image of the original sheet on the recording sheet by repeatedly executing a recording operation of forming an image of the original sheet in the unit of a band with use of non-rotated image data, to which the rotation processing by the rotation processing circuit to sequentially decompressing the non-divided compressed image data from the top thereof, has not been applied.

\* \* \* \* \*